United States Patent [19]

Barnes et al.

[11] Patent Number: 4,524,947
[45] Date of Patent: Jun. 25, 1985

[54] PROPORTIONAL SOLENOID VALVE

[75] Inventors: Pierre D. Barnes; Maynard W. Marts, both of Hutchinson, Kans.

[73] Assignee: The Cessna Aircraft Company, Wichita, Kans.

[21] Appl. No.: 445,773

[22] Filed: Nov. 30, 1982

[51] Int. Cl.³ .............................................. F16K 31/06
[52] U.S. Cl. .................... 251/129; 251/141; 251/337
[58] Field of Search ................ 251/129, 141, 337

[56] References Cited

U.S. PATENT DOCUMENTS

| 2,436,992 | 3/1948 | Ernst | 251/129 X |
|---|---|---|---|
| 2,987,293 | 6/1961 | Knudson | 251/141 |
| 3,100,103 | 8/1963 | Bullard | 251/141 X |
| 3,220,184 | 11/1965 | Oprecht | 251/129 X |
| 3,684,238 | 8/1972 | Michellone et al. | 251/129 |
| 3,788,597 | 1/1974 | Ichioka | 251/129 |
| 3,970,282 | 7/1976 | Hansen | 251/129 |

Primary Examiner—Arnold Rosenthal
Attorney, Agent, or Firm—Edward L. Brown, Jr.

[57] ABSTRACT

A normally closed spool type solenoid-controlled valve which changes its opening in proportion to the amount of current supplied to the solenoid. The spool which blocks the valve opening in an overlapping relation is held in a closed position by a dual spring design having differing spring rates wherein the lighter spring holds the spool in an overlapping closed position.

8 Claims, 2 Drawing Figures

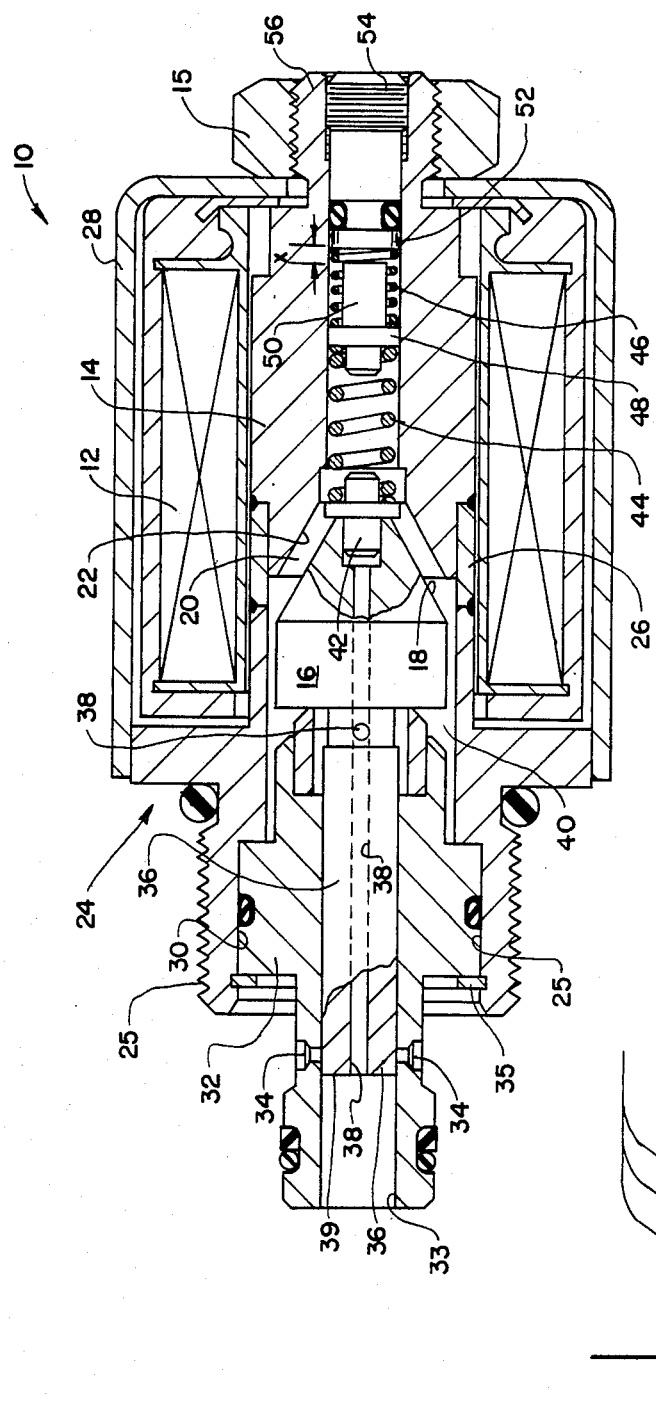

PROPORTIONAL SOLENOID VALVE

BACKGROUND OF THE INVENTION

The invention relates to proportional solenoid-controlled valves and more specifically to a normally closed spool type solenoid valve which as it begins to open changes it opening or orifice size in proportion to the amount of current supplied to the solenoid.

Normally closed solenoid valves, such as shown in U.S. Pat. No. 3,737,141, are the type which pull a spring-biased poppet off a seat as the valve opens. Before the poppet opens, the solenoid force must overcome a pressure-induced force which holds the poppet closed. The amount of this force is dependent upon the pressure differential across the poppet and the area of the poppet seat. This pressure-induced force decreases as the valve opens, while the force produced by the solenoid increases as the valve opens. When the air gap between the pole piece and the armature is the largest, the force the solenoid generates is the weakest, which is converse to the requirements of a conventional poppet valve.

SUMMARY OF THE INVENTION

Rather than a conventional tapered end poppet closing an orifice, the present invention utilizes a spool in a bore which blocks lateral passages in an overlapping relation, thereby avoiding the pressure-induced forces of a conventional poppet which must be overcome. The spool and solenoid armature are held in the closed position by a dual spring design of differing spring rates. The first spring, with a very light spring rate, holds the spool in an extended overlap position when the solenoid is fully de-energized, to reduce spool leakage. When the solenoid is initially energized at current levels, for example 0.1 amps; the solenoid force will shift the spool to its initial opening position causing the first spring to compress to its stop with a very slight deflection of the much stiffer second spring. As the current level to the solenoid increases, the spool opens further and the second spring will compress so that the opening of the valve is proportional to the current supplied. The solenoid is externally adjustable by moving the stop on the first spring whereby the amount of current required to start the initial flow can be varied between, as for example, 0.1 amps and 0.4 amps. Low leakage across the spool is achieved in this dual spring design with the additional overlap caused by the first spring in the fully de-energized position of the solenoid.

It is therefore the principal object of the present invention to provide a normally closed spool type proportional solenoid valve with improved leakage characteristics.

Another object of the present invention is to provide a proportional solenoid valve with no differential pressure forces to overcome as the valve initially opens.

A further object of the present invention is to provide a normally closed solenoid valve with dual springs in a series arrangement having differing spring rates whereby added overlap is provided to improve the leakage characteristics.

Other objects and advantages of the present invention are described in or will become apparent from the following detailed description and accompanying drawings of the preferred embodiment.

BRIEF DESCRIPTION OF THE DRAWINGS

FIG. 1 is a longitudinal sectional view through the solenoid valve in its fully de-energized closed position; and FIG. 2 is a curve illustrating flow vs. current of the present valve at various setting of the adjustable stop.

DETAILED DESCRIPTION OF THE PREFERRED EMBODIMENT

FIG. 1 illustrates a normally closed proportional solenoid-operated valve generally described by reference numeral 10. The valve 10 comprises a coil 12 which surrounds a fixed core assembly 14 which is held in place by a nut 15. Concentrically spaced inside the end of core 14 is an armature member 16 which defines an air gap 20 between the conical surface 18 of the armature and the pole face 22 of the core. Attached to core 14 is a sleeve assembly 24 which is welded to a stainless steel low magnetic sleeve 26 which in turn is welded to core 14. Sleeve assembly 24 includes a threaded left end 25 which mounts the solenoid valve 10 in whatever application the solenoid valve is being utilized. Surrounding the coil 12 of the solenoid is a conductive jacket 28 which protects the electrical components of the solenoid. Located in the left end of sleeve assembly 24 is a bore 30 which receives a valve body 32 held in place by snap ring 35. Passing through valve body 32 is a longitudinal bore 33 which is intersected by a pair of lateral passages 34. Slidably positioned in valve bore 33 is a valve spool 36 which is attached to armature 16 of the solenoid. The spool 36 includes a longitudinal passage 38 which equalizes the pressure on both ends of spool 36, including armature cavity 40 so that no pressure-induced forces are created on spool 36. The left edge 39 of spool 36 overlaps lateral passages 34 in the fully closed position of the valve, as illustrated in FIG. 1. Armature 16 is held in axial alignment in the valve through valve spool 36 sliding in valve body 32. Armature 16, in its de-energized position, is urged in a leftwardly direction by a pair of compression springs 44 and 46 positioned in series, one behind the other. Spring 44 having a relatively high spring rate contacts armature 18 through a plunger 42 while the left end of spring 44 contacts spring 46 through a second plunger member 48. Spring 46 is a very light spring, with a spring rate much less that that of spring 44. Extending from plunger 48 is an extension member 50 positioned in the center of spring 46 which engages an adjustable stop member 52. On the right end of stop 52 is a threaded screw 54 which is engageable by an allen wrench to longitudinally move the stop 52 forwards or backwards depending upon the desired current level at the initial opening position of the valve. A distance X is adjustably provided between extension 50 and stop member 52 which will be the plateau point where the heavy spring 44 begins to deflect and the light spring deflection is eliminated.

Solenoid valve 10 is designed to operate with an approximately 50 PSI pressure differential across lateral passages 34 to drain flowing out the left end of valve spool bore 33. The curent used in the solenoid coil can be either D.C. or dithered current. The solenoid valve 10 is utilized in systems requiring low volume in the one to two GPM range in applications such as speed control systems or as a pilot valve controlling a larger directional control valve. The valve 10 could also be converted to a normally open proportional solenoid valve with lateral passages through the spool 36, as well as a pull type conventional proportional solenoid valve.

OPERATION

Proportional solenoid valves, as compared with full open or closed solenoids, permit the orifice size or valve opening to be changed by varying the amount of current flow to the solenoid. With an increase in current, the orifice size increases proportionally so that a flow vs. current plot would be linear.

With solenoid valve 10 in its fully de-energized position, as illustrated in the drawing, the valve spool 36 completely overlaps passages 34 so that there is no flow through the valve. The amount of overlap of the spool, which is the distance between the left edge 39 of the spool and the lateral passages 34, is intended to reduce the amount of leakage between bore 33 and spool 36, in a normal tolerance fit. This overlap is approximately the same as the distance X seen at the right hand end of the valve between extension member 50 and adjustable stop 52. In light of the substantial overlap, passages 34 do not begin to open until extension 50 comes in contact with stop 52. Prior to this point, the primary spring force on the armature 16 is being caused by light spring 46, since spring 44 has no substantial deflection. After extension 50 contacts stop 52, spring 44 will begin to deflect and the spring resistance increases sharply. As initial current is supplied to solenoid coil 12, in the order of 0.1 to 0.2 amps, the solenoid force produced by this current flow across air gap 20 is applied to the springs 44 and 46. Since spring 46 is a very light spring, it will compress under this initial light solenoid force while spring 44, requiring a much higher force, will only slightly deflect. Spool 36 under the initial solenoid force moves to the right compressing spring 46 until extension 50 comes in contact with adjustable stop 52. The left edge 39 of spool 36 is now beginning to open lateral passages 34, and any further opening will require additional amperage to coil 12 to compress stiffer spring 44.

In viewing the flow vs. current plot of FIG. 2, it can be seen that as the amperage level is increased, the flow level increases at the same rate. To adjust the solenoid valve 10 to that point which the valve begins to open, can be accomplished by tightening or relieving screw 54 to vary the load on spring 46 and the position of stop member 52. FIG. 2 illustrates three separate curves wherein the amount of current at which the valve begins to open is varied to meet the particular requirements of each application. The movement of stop 52 not only adjusts the spring force on armature 16 but also the plateau point wherein the spring compression is transformed from spring 46 to spring 44. With an adjustable solenoid of this type, valve 10 can be adjusted so that the initial opening is at varying current levels. In doing so, the position of the flow curve, as seen in FIG. 2, using a constant pressure differential across the orifice can slide out the current scale while the slope of the curve remains the same. If a change in the slope of the curve is needed, a design change in the spring rates can be made to fit a particular application.

Having described the invention with sufficient clarity to enable those familiar with the art to construct and use the invention, we claim:

1. A normally closed two way proportional solenoid-operated valve assembly including:
   a body having a bore therein;
   a lateral passage in the bore;
   a spool slidably positioned in the bore overlapping the lateral passage in the closed position and forming a variable opening with the lateral passage in various open positions;
   an armature means attached to said spool for positioning the spool and controlling the valve opening;
   a pole piece means in the body positioned adjacent the armature forming an air gap therebetween;
   a first spring means having a predetermined spring rate urging the armature and spool toward the overlapping closed position;
   a second spring means having a lesser spring rate than the first spring means positioned in series with the first spring means urging the armature and spool toward the overlapping closed position;
   coil means operable to produce a circuit of electromagnetic flux line flow and provide a variable attractive force between the armature and pole piece to overcome the second spring means and the first spring means in sequence with intermediate positions of the armature and spool therebetween.

2. The valve assembly of claim 1 including an adjustable stop means aligned with the second spring means positioned to block further compression of second spring means as the spool begins to open the lateral passage.

3. The valve assembly of claim 1 wherein the first and second spring means are concentrically aligned in series.

4. The valve assembly of claim 1 wherein the first and second spring means are compresson springs concentrically aligned in series with relative spring rates such that the second spring means will fully deflect before the first spring means begins to deflect.

5. The valve assembly of claim 1 including an adjustable stop means aligned with the second spring means positioned to block further compression of second spring means as the spool begins to open the lateral passage, and wherein the first and second spring means are compression springs concentrically aligned in series and separated by a plunger member having an extension which contacts the stop means as the spool begins to open the lateral passage, thereby terminating the compression of the second spring means.

6. The valve assembly of claim 1 including an adjustable stop means positioned adjacent the second spring means preventing the second spring means from further compression as the spool begin to open the lateral passage.

7. The valve assembly of claim 1 wherein the first and second spring means are compression springs concentrically aligned in series inside the pole piece with relative spring rates such that the second spring means will fully deflect before the first spring mean begins to deflect.

8. The valve assembly of claim 1, wherein the spool includes a longitudinal passage means therein providing equal pressure forces on opposite ends of the spool.

\* \* \* \* \*